US010826328B2

(12) United States Patent
Lee et al.

(10) Patent No.: US 10,826,328 B2
(45) Date of Patent: Nov. 3, 2020

(54) RECEIVER OF WIRELESS POWER TRANSMISSION SYSTEM BEING SWITCHED TO INCREASE VOLTAGE OF RESONANCE CIRCUIT

(71) Applicant: Electronics and Telecommunications Research Institute, Daejeon (KR)

(72) Inventors: Sang Han Lee, Daejeon (KR); In Kui Cho, Daejeon (KR); Sang-Won Kim, Daejeon (KR); Seong-Min Kim, Daejeon (KR); Jung Ick Moon, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 150 days.

(21) Appl. No.: 16/163,359

(22) Filed: Oct. 17, 2018

(65) Prior Publication Data

US 2019/0334379 A1 Oct. 31, 2019

(30) Foreign Application Priority Data

Apr. 30, 2018 (KR) .................. 10-2018-0050005

(51) Int. Cl.
*H02J 50/12* (2016.01)
*H02J 50/80* (2016.01)
*H02J 5/00* (2016.01)

(52) U.S. Cl.
CPC ............. *H02J 50/12* (2016.02); *H02J 5/005* (2013.01); *H02J 50/80* (2016.02)

(58) Field of Classification Search
CPC .. H02J 50/12; H02J 50/10; H02J 50/80; H02J 7/00; H02J 7/025; H02J 5/005;
(Continued)

(56) References Cited

U.S. PATENT DOCUMENTS 10,068,702 B2 * 9/2018 Posat .................... H01L 23/645
2012/0161542 A1 6/2012 Kim et al.
(Continued)

FOREIGN PATENT DOCUMENTS

KR 101377124 B1 4/2014
KR 1020170118477 A 10/2017
KR 1020180004673 A 1/2018

OTHER PUBLICATIONS

Choi et al., "A Resonant Current-Mode Wireless Power Receiver and Battery Charger With −32 dBm Sensitivity for Implantable Systems," in IEEE Journal of Solid-State Circuits, vol. 51, No. 12, pp. 2880-2892, Dec. 2016.
(Continued)

*Primary Examiner* — Rexford N Barnie
*Assistant Examiner* — Jagdeep S Dhillon
(74) *Attorney, Agent, or Firm* — William Park & Associates Ltd.

(57) ABSTRACT

A receiver of a wireless power transmission system may include a capacitor-and-inductor configured to receive power from a transmitter using a resonance, at least one capacitor configured to connect to an output node of the receiver, and a plurality of switches configured to control current flow within the receiver. The plurality of switches may be controlled so that the capacitor-and-inductor may be disconnected from the at least one capacitor and the output node at preset periods. Current resonating in the capacitor-and-inductor may increase during disconnection between the at least one capacitor and the output node. The plurality of switches may output the increased current to the battery by connecting the capacitor-and-inductor to the capacitor and the output node after the period, connect at least one capacitor and the output node in series after the period, and (Continued)

operate to reduce root mean square (RMS) current within the receiver.

13 Claims, 6 Drawing Sheets

(58) Field of Classification Search
CPC .......... H01F 38/14; H01F 27/42; H01F 37/00; G01D 5/20; G01D 5/2006; H03H 2/00; H03H 2/005; H02M 3/335
USPC ......... 307/104, 149, 66, 80, 82, 109, 43, 38; 363/21.12; 323/311; 320/107
See application file for complete search history.

(56) References Cited

U.S. PATENT DOCUMENTS

| | | | |
|---|---|---|---|
| 2012/0224398 A1* | 9/2012 | Franco | H03K 17/302 363/21.12 |
| 2013/0099728 A1* | 4/2013 | Wang | H02J 7/0031 320/107 |
| 2014/0028107 A1* | 1/2014 | Kwon | H02J 50/12 307/104 |
| 2016/0156200 A1 | 6/2016 | Kim et al. | |
| 2017/0018967 A1* | 1/2017 | Berkhout | H02J 5/005 |
| 2018/0128650 A1* | 5/2018 | Bruwer | G01D 5/2006 |
| 2018/0366984 A1* | 12/2018 | Joye | H02J 7/025 |

OTHER PUBLICATIONS

Gougheri et al., "Current-Based Resonant Power Delivery With Multi-Cycle Switching for Extended-Range Inductive Power Transmission," in IEEE Transactions on Circuits and Systems I: Regular Papers, vol. 63, No. 9, pp. 1543-1552, Sep. 2016.

* cited by examiner

RECEIVER OF WIRELESS POWER TRANSMISSION SYSTEM BEING SWITCHED TO INCREASE VOLTAGE OF RESONANCE CIRCUIT

CROSS-REFERENCE TO RELATED APPLICATION(S)

This application claims the priority benefit of Korean Patent Application No. 10-2018-0050005 filed on Apr. 30, 2018, in the Korean Intellectual Property Office, the disclosure of which is incorporated herein by reference for all purposes.

BACKGROUND

1. Field

One or more example embodiments relate to a wireless power transmission system.

2. Description of Related Art

A medical implant system refers to a system that continuously monitors and processes biosignals and may power a battery as a power source. It is impractical to frequently replace a battery in the medical implant system. Accordingly, research on applying wireless power transmission technology to the medical implant system is ongoing.

A receiver for wireless power transmission in a low power system may be classified into a voltage-mode receiver capable of reconstructing a voltage mode and a current-mode receiver capable of reconstructing a current mode. The current mode receiver may efficiently transmit power even at a small coupling coefficient, for example, k12, through a multi-resonance operation and may directly charge the battery without a precise voltage adjuster and thus, may be a receiver suitable for the medical implant system.

SUMMARY

At least one example embodiment provides a wireless power transmission system that may further efficiently charge a battery configured to output a relatively low voltage by increasing a voltage of a resonance circuit, and a receiver of the wireless power transmission system.

According to an aspect of at least one example embodiment, there is provided a receiver of a wireless power transmission system, the receiver including an inductor configured to resonate with a transmitter that transmits power in the wireless power transmission system; a capacitor configured to store current occurring in the inductor by resonance of the inductor; and a plurality of switches configured to increase a magnitude of current occurring in the inductor by disconnecting the inductor and the capacitor and to connect the inductor, the capacitor, and an output node in series to deliver the current with the increased magnitude to the output node.

The plurality of switches may include a first switch configured to connect the inductor and a ground node of the receiver; a second switch configured to connect a node between the first switch and the inductor and a first node of the capacitor; a third switch configured to connect the ground node and a second node of the capacitor; a fourth switch configured to connect the second node and the output node; and a fifth switch configured to connect the first node and the output node.

The first switch may be configured to close at preset periods and to deliver the current occurring in the inductor to the ground node, and the second switch may be configured to open at preset periods and to disconnect the inductor and the capacitor during delivery of the current occurring in the inductor to the ground node.

The magnitude of the current occurring in the inductor may increase due to the resonance of the inductor in response to the first switching being closed at the period.

The second switch may be configured to close at preset periods and to deliver the current with the increased magnitude to the capacitor, and the first switch may be configured to open at preset periods and to disconnect the inductor and the ground node during delivery of the current with the increased magnitude to the capacitor.

The third switch and the fifth switch may be configured to close during delivery of the current occurring in the inductor to the ground node through the first switch, so that the capacitor is connected to the output node in parallel.

The fourth switch may be configured to open in response to the third switch and the fifth switch being closed, and to deliver power of the capacitor to the output node.

The fourth switch may be configured to close in response to the second switch being closed and the first switch being opened, and to deliver the current with the increased magnitude to the output node.

The third switch and the fifth switch may be configured to open in response to the fourth switch being closed, and to connect the inductor, the capacitor, and the output node in series.

When the receiver includes a plurality of capacitors, the plurality of switches may be configured to connect the plurality of capacitors and the output node in parallel during disconnection between the inductor and the plurality of capacitors, and to connect the inductor, the plurality of capacitors, and the output node in series direction connection between the inductor and the plurality of capacitors.

According to an aspect of at least one example embodiment, there is provided a receiver of a wireless power transmission system, the receiver including a resonance circuit configured to resonate with a transmitter of the wireless power transmission system; a battery and/or power storage capacitor configured to store power transmitted from the transmitter; a switching capacitor circuit including a plurality of capacitors configured to connect between the resonance circuit and the battery; and a switch configured to deliver current amplified at the resonance circuit to the switching capacitor circuit at preset periods. The switching capacitor circuit is configured to connect the plurality of capacitors so that the plurality of capacitors, the resonance circuit, and the battery and/or power storage capacitor are connected in series in response to receiving the current amplified at the resonance circuit through the switch.

The switching capacitor circuit may be configured to connect the plurality of capacitors so that the plurality of capacitors and the battery and/or power storage capacitor are connected in parallel in response to not receiving the current of the resonance circuit through the switch.

The switching capacitor circuit may be configured to connect the plurality of capacitors so that a voltage of a node connecting the resonance circuit and the switching capacitor circuit corresponds to an integer multiple of a voltage of the battery and/or power storage capacitor in response to receiving the current amplified at the resonance circuit through the switch.

According to an aspect of at least one example embodiment, there is provided a receiver of a wireless power transmission system, the receiver including at least one capacitor configured to connect to a resonance circuit of the receiver at preset periods; and a plurality of switches configured to change a connection among the capacitor, the resonance circuit, and an output node of the receiver based on the period. The plurality of switches is configured to connect the at least one capacitor and the output node in series every time the at least one capacitor and the resonance circuit are connected based on the period, and to connect the at least one capacitor and the output node every time the at least one capacitor and the resonance circuit are disconnected based on the period.

According to example embodiments, since a voltage of a resonance circuit of a receiver of a wireless power transmission system increases, it is possible to further efficiently charge a battery that outputs a relatively low voltage.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
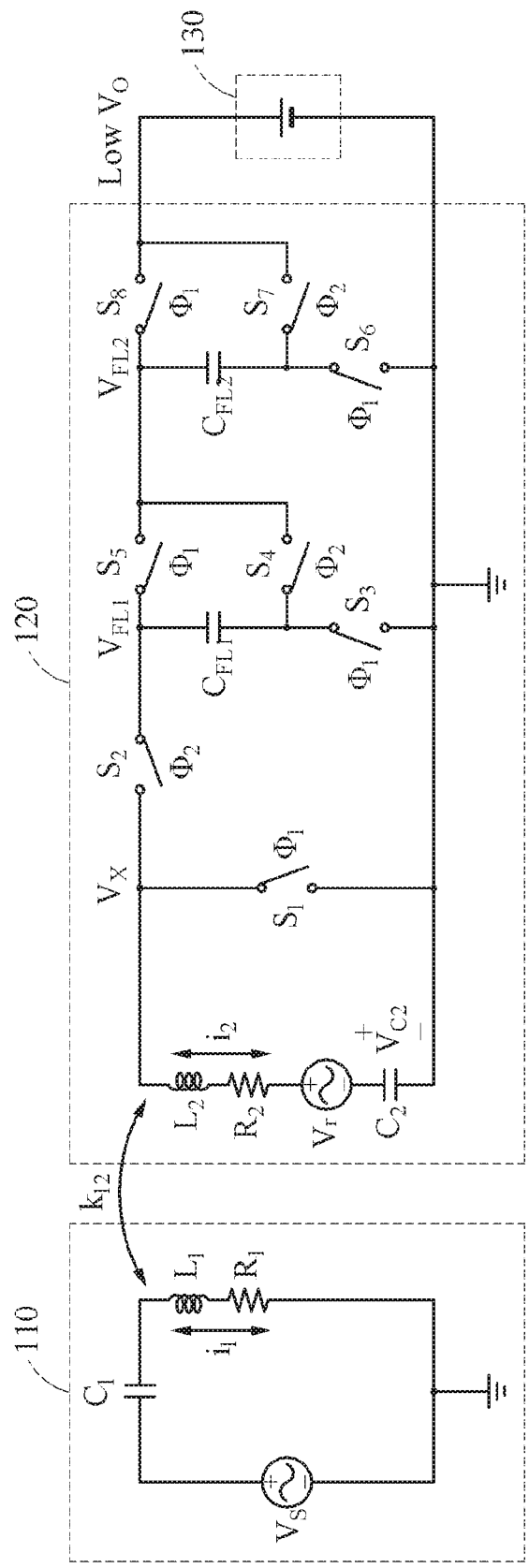
FIG. 1 illustrates a structure of a wireless power transmission system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described with reference to the accompanying drawings. In the respective drawings, like reference numerals refer to like elements throughout.

FIG. 1 illustrates a structure of a wireless power transmission system according to an example embodiment.

Referring to FIG. 1, the wireless power transmission system includes a transmitter 110 and a receiver 120. The transmitter 110 is a circuit configured to wirelessly transmit power of an external power source to the receiver 120. The receiver 120 is a circuit configured to receive the power wirelessly transmitted from the transmitter 110. Each of the transmitter 110 and the receiver 120 may include a resonance circuit including an inductor and a capacitor.

The receiver 120 may connect to a battery 130 and may supply the power transmitted from the transmitter 110 to the battery 130 to charge the battery 130. The battery 130 may output a relatively low voltage, for example, a low voltage of about 1 V. When the battery 130 supplies power to a medical implant system, the battery 130 may need to output relatively low voltage since an analog front end, a signal processor, a memory, a communication circuit, etc., of the medical implant system is integrated on a small single chip, such as a very large scale integration (VLSI), and a metal-oxide semiconductor field effect transistor (MOSFET) device having a short gate is used to reduce power consumption. The battery 130 may have a height of several millimeters. The wireless power transmission system may be a voltage-boosted current-mode receiver.

The receiver 120 refers to a resonance circuit that resonates with the transmitter 110 and may include an inductor $L_2$ and a capacitor $C_2$. The receiver 120 may include a plurality of switches $S_1$, $S_2$, $S_3$, $S_4$, $S_5$, $S_6$, $S_7$, and $S_8$. The receiver 120 may include at least one capacitor distinguished from the capacitor $C_2$ of the resonance circuit. Referring to FIG. 1, the receiver 120 is assumed to include two flying capacitors $C_{FL1}$ and $C_{FL2}$ separate from the capacitor $C_2$ of the resonance circuit. Capacitance and a number of flying capacitors may be determined based on time constant and charging efficiency of the battery 130.

Referring to FIG. 1, the switches $S_1$ and $S_2$ may deliver the current of the resonance circuit including the inductor $L_2$ and the capacitor $C_2$ to a ground node or the at least one capacitor distinguished from the capacitor $C_2$. In detail, the switch $S_1$ may be provided between the inductor $L_2$ and the ground node and the switch $S_2$ may be provided between the inductor $L_2$ and a first node $V_{FL1}$ of the flying capacitor $C_{FL1}$. The switch $S_1$ and the switch $S_2$ may be connected to a switching node $V_X$ of the inductor $L_2$.

Referring to FIG. 1, the switches $S_3$ to $S_8$ may control connection of the flying capacitors $C_{FL1}$ and $C_{FL2}$. The switch $S_3$ may be provided between a second node distinguished from the first node $V_{FL1}$ of the flying capacitor $C_{FL1}$ and the ground node, and the switch $S_4$ may be provided between the second node of the flying capacitor $C_{FL1}$ and an output node. The switch $S_5$ may be provided between the first node $V_{FL1}$ and the output node. Also, each of the switches $S_6$, $S_7$, and $S_8$ may be connected to the flying capacitor $C_{FL2}$ in a similar manner that each of the switches $S_3$ to $S_8$ is connected to the flying capacitor $C_{FL1}$. According to another embodiment, when the receiver 120 includes an additional flying capacitor $C_{FLk}$ in addition to the flying capacitors $C_{FL1}$ and $C_{FL2}$, switches $S_{3k}$, $S_{3k+1}$, and $S_{3k+2}$ corresponding to the flying capacitor $C_{FLk}$ may be connected in a similar manner that each of the switches $S_3$ to $S_8$ connects to the flying capacitor $C_{FL1}$.

Referring to FIG. 1, the plurality of switches $S_1$ to $S_8$ of the receiver 120 may be closed at preset switching periods. Switching periods $\varphi_1$ and $\varphi_2$ represent a time section or period in which each of the switches is closed. The switching period $\varphi_1$ refers to a pile-up resonance and pumping charging period for increasing energy of a resonance tank or a resonance circuit and for supplying energy from at least one flying capacitor, for example, the first flying capacitor $C_{FL1}$ and the second flying capacitor $C_{FL2}$ of FIG. 1, to the battery 130, and the switch period $\varphi_2$ refers to a period for delivering current of the resonance tank to the battery 130.

Figure 2A:
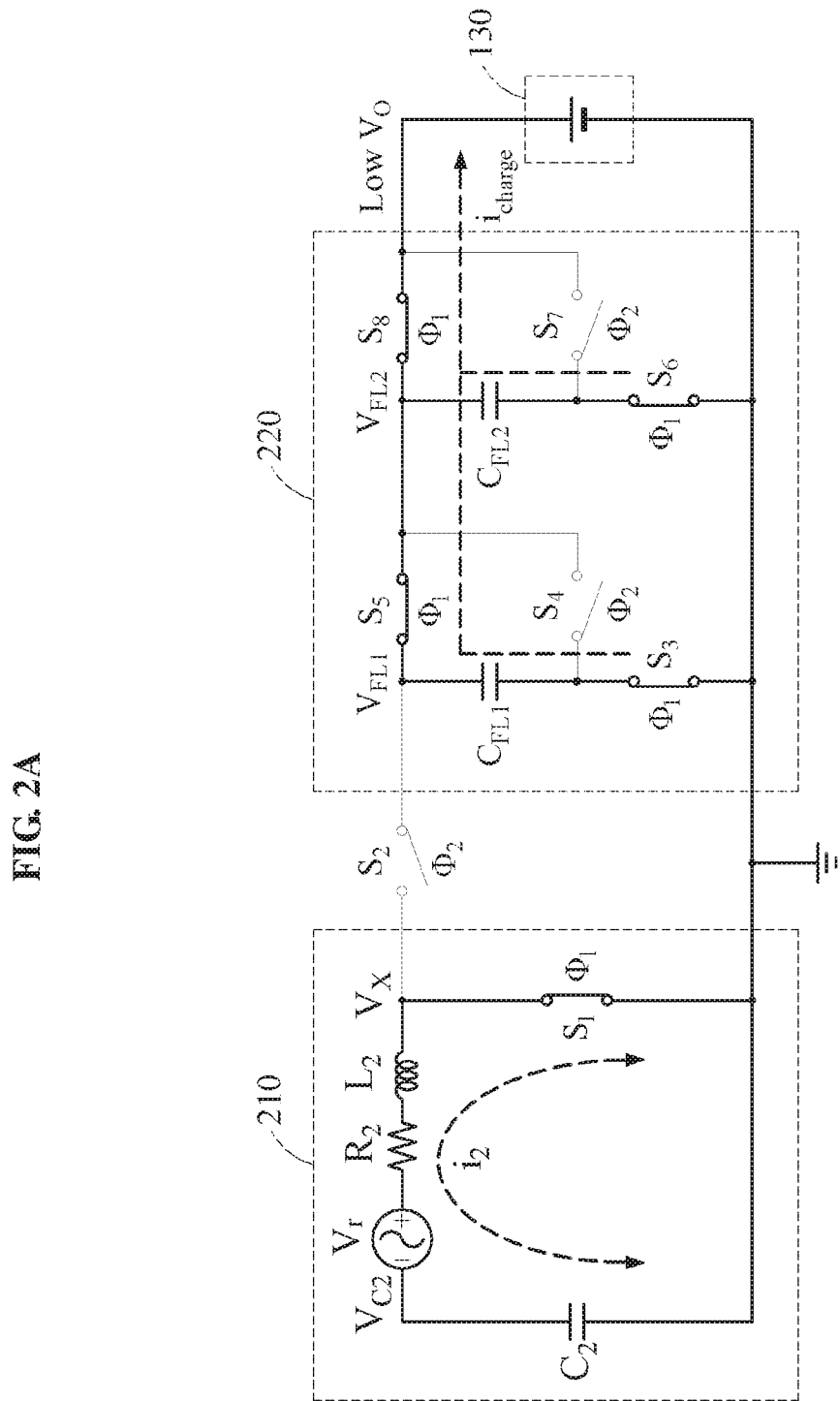
FIGS. 2A and 2B illustrate examples of describing an operation of a receiver of a wireless power transmission system for each switching period according to an example embodiment.
Figure 2B:
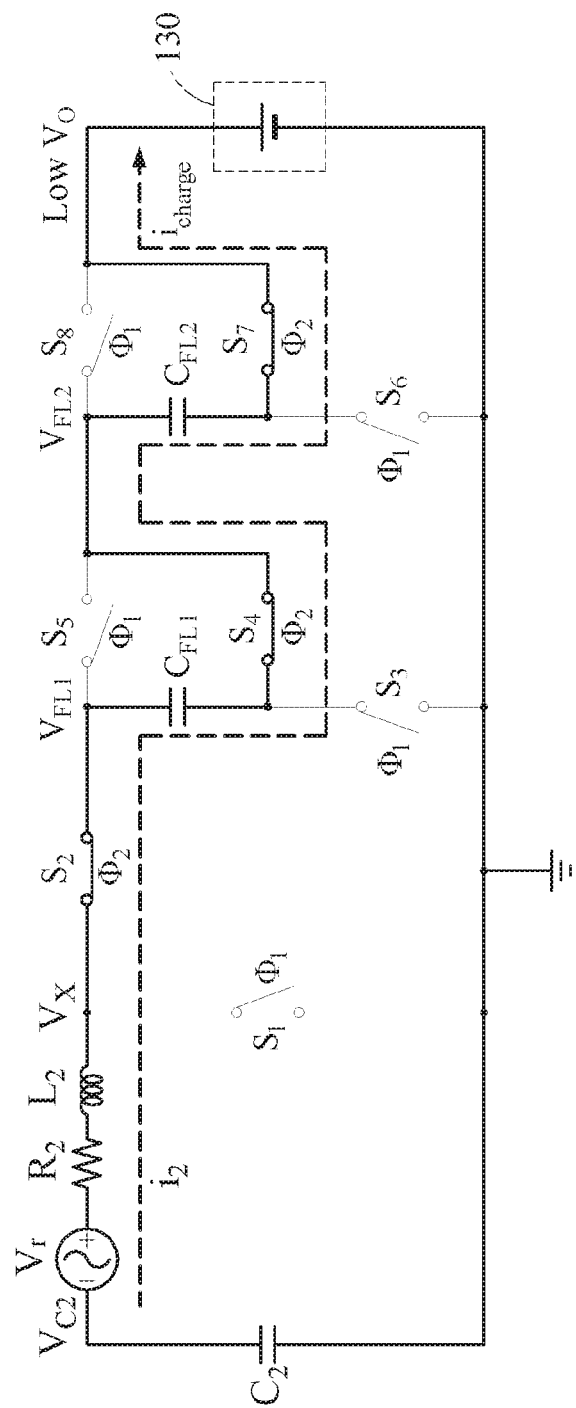

FIGS. 2A and 2B illustrate examples of describing an operation of a receiver of a wireless power transmission system for each switching period according to an example embodiment.

Referring to FIG. 2A, in a switching period $\varphi_1$, switches $S_1$, $S_3$, $S_5$, $S_6$, and $S_8$ of the receiver may be closed and remaining switches may be opened. Accordingly, the receiver may be separated into a resonance circuit 210 that includes a resonance coil and a resonance capacitor and a switched capacitor circuit 220 in which flying capacitors $C_{FL1}$ and $C_{FL2}$ are connected in parallel. The switched capacitor circuit 220 may include a battery 130, for example, a low voltage chargeable battery. A voltage of the battery 130 may vary based on a type of a device that uses power of the battery 130.

In the switching period $\varphi_1$, the receiver is separated into the resonance circuit 210 and the switched capacitor circuit 220, which may increase a magnitude of current $i_2$ of the resonance circuit 210. That is, while the switch $S_1$ is closed, the magnitude of the current $i_2$ of the resonance circuit 210 may increase. The switching period $\varphi_1$, that is, a period of time in which the switches $S_1$, $S_3$, $S_5$, $S_6$, and $S_8$ of the receiver are closed and the remaining switches are opened may be determined based on power $P_{charge}$ delivered to the battery 130. The switching period $\varphi_1$ may refer to a period for piling up or pumping energy using a resonance.

In addition, in a switching period $\Phi_2$ in which the magnitude of current $i_2$ of the resonance circuit 210 is not increased, the flying capacitors $C_{FL1}$ and $C_{FL2}$ charged with the current $i_2$ of the resonance circuit 210 may be connected in parallel to an output node of the receiver and may charge the battery 130 through pumping. Accordingly, in the switching period $\Phi_2$, the flying capacitors $C_{FL1}$ and $C_{FL2}$ charged with the current $i_2$ of the resonance circuit 210 may be connected in parallel to the output node and may charge the battery 130 through pumping.

Referring to FIG. 2B, in the switching period $\Phi_2$, switches $S_2$, $S_4$, and $S_7$ of the receiver may be closed and the remaining switches may be opened. Accordingly, the resonance coil, the resonance capacitor, the flying capacitors $C_{FL1}$ and $C_{FL}2$, and the battery 130 may be connected in series. The switching period $\Phi_2$ may be a period in which the flying capacitors $C_{FL1}$ and $C_{FL}2$ and the battery 130 are simultaneously charged with the current $i_2$ of the resonance circuit 210 with the magnitude increased in the previous switching period $\Phi_1$. Accordingly, in the switching period $\Phi_2$, the battery 130 may be charged with the current $i_2$ of the resonance circuit 210 increased in the switching period $\Phi_1$.

In the switching period $\varphi_2$, power may be stored in the flying capacitors $C_{FL1}$ and $C_{FL2}$ of the receiver. In the switching period $\varphi_1$ starting after the switching period $\varphi_2$, the battery 130 may be connected in parallel to the flying capacitors $C_{FL1}$ and $C_{FL2}$. In the switching period $\varphi_2$, the power stored in the flying capacitors $C_{FL1}$ and $C_{FL2}$ may be stored in the battery 130. As the switching periods $\varphi_1$ are $\varphi_2$ are repeated, the flying capacitors $C_{FL1}$ and $C_{FL2}$ may be charged or discharged.

As described above, while the switch $S_1$ is closed, the magnitude of current $i_2$ of the resonance circuit 210 may increase. In the switching period $\varphi_2$ starting after the switching period $\varphi_1$, the magnitude-increased current $i_2$ of the resonance circuit 210 may be output to the battery 130 through the flying capacitors $C_{FL1}$ and $C_{FL2}$ connected in series to the battery 130.

FIG. 2A illustrates a switching node $V_x$ of the resonance circuit 210 generated in the switching period $\varphi_1$. Referring to FIGS. 2A and 2B, the switching node $V_x$ may have a voltage of 0 V in the switching period $\varphi_1$ and may have a voltage corresponding to a sum of voltages of the battery 130 and the flying capacitors $C_{FL1}$ and $C_{FL2}$ in the switching period $\varphi_2$. An effective voltage of the switching node $V_x$ may be 3 $V_O$. That is, in the switching period $\varphi_2$, the voltage of the switching node $V_x$ may be $3V_O$. The voltage of the switching node $V_x$ may increase by integer multiple of the voltage of the battery 130 every switching period $\varphi_2$.

According to some example embodiments, the effective voltage of the switching node $V_x$ may be determined based on a number of flying capacitors included in the receiver.

A peak value of the current $i_2$ of the resonance circuit 210 may decrease based on the effective voltage of the switching node Vx. Root mean square (RMS) current of a coil of the receiver may decrease according to a decrease in the peak value of the current $i_2$ of the resonance circuit 210.

Figure 3:
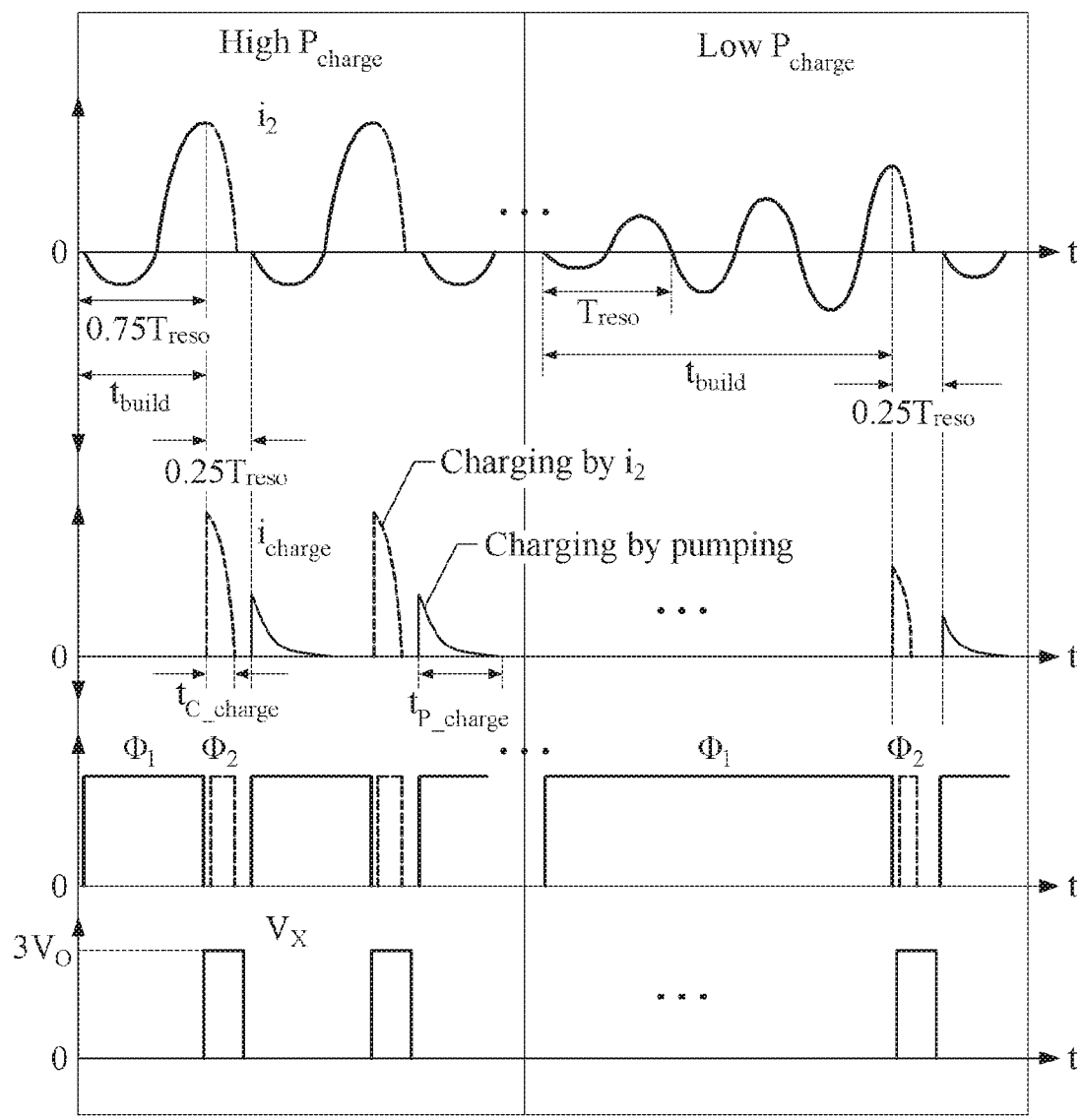
FIG. 3 illustrates examples of a graph to describe an operation of the wireless power transmission system shown in FIG. 1 and FIGS. 2A and 2B.

FIG. 3 illustrates examples of a graph to describe an operation of the wireless power transmission system shown in FIG. 1 and FIGS. 2A and 2B.

FIG. 3 illustrates a magnitude of voltage or current flowing in each node of the wireless power transmission system when delivering relatively great power to a battery and a magnitude of voltage or current flowing in each node of the wireless power transmission system when delivering relatively small power to the battery. Here, a length $t_{build}$ of a switching period $\Phi_1$ may be automatically adjusted based on a magnitude of power $P_{charge}$ that is delivered to the battery. That is, the magnitude of power $P_{charge}$ that is delivered to the battery may be variable based on the length $t_{build}$ of the switching period $\Phi_1$ in terms of effectiveness optimization. For example, although the length $t_{build}$ of the switching period $\Phi_1$ increases, the magnitude of power $P_{charge}$ delivered to the battery may not decrease. Accordingly, the length $t_{build}$ of the switching period $\varphi_1$ may be adjusted based on the magnitude of power $P_{charge}$ delivered to the battery.

Figure 4:
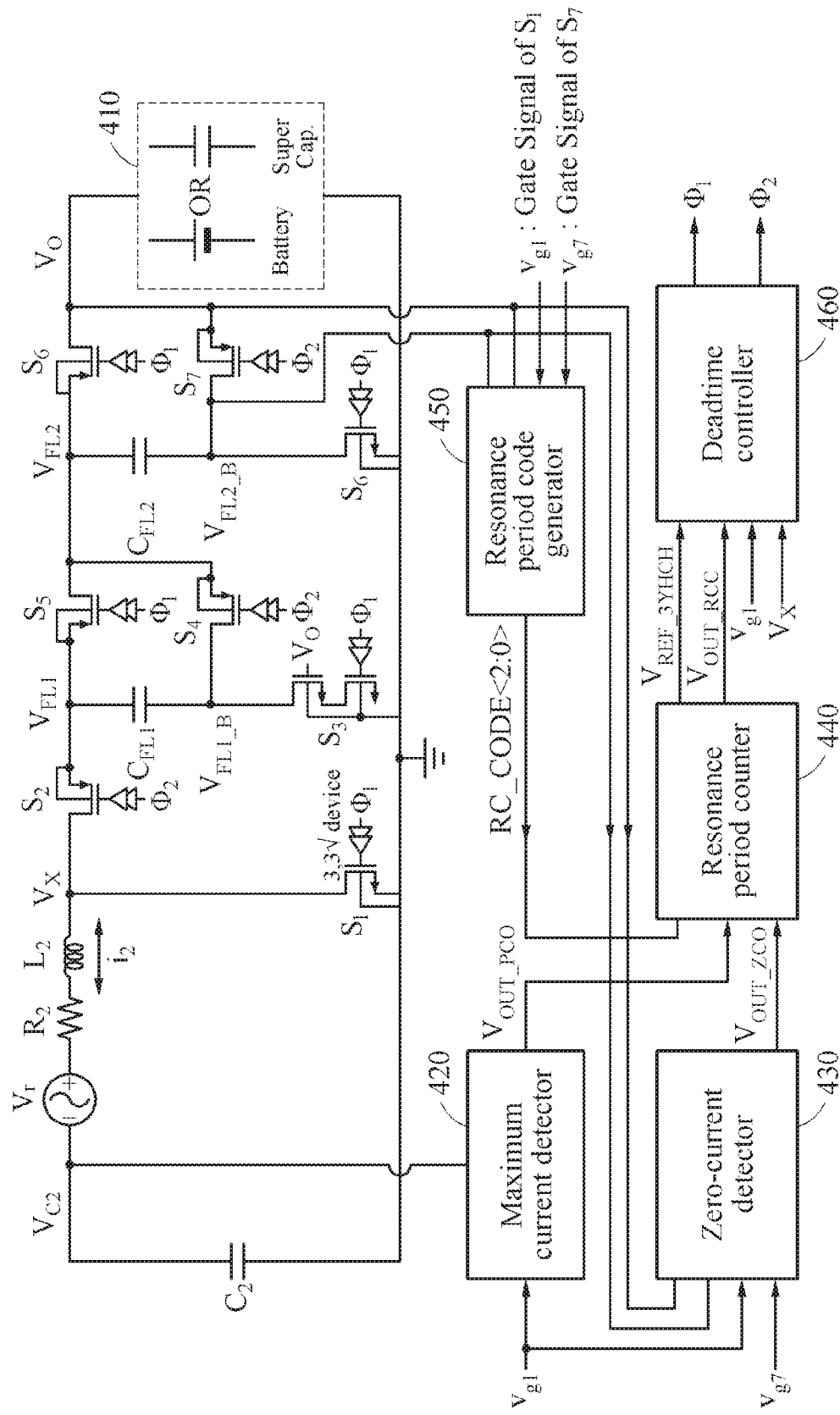
FIG. 4 illustrates a structure of a receiver of a wireless power transmission system according to an example embodiment.

FIG. 4 illustrates a structure of a receiver of a wireless power transmission system according to an example embodiment. Referring to FIG. 4, the receiver may be used to charge a battery 410. To control a plurality of switches, the receiver may include a maximum current detector 420, a zero-current detector 430, a resonance period counter 440, and a resonance period code generator 450. The maximum current detector 420 and the zero-current detector 430 may detect a maximum value and a zero-current value of current, for example, the current $i_2$ of FIGS. 2A and 2B, flowing in a resonance circuit, for example, the resonance circuit 210 of FIG. 2A, of the receiver, respectively.

In detail, the maximum current detector 420 may detect a point in time at which the current flowing in the resonance circuit reaches the maximum value based on a voltage of a resonance capacitor $V_{C2}$. The zero-current detector 430 may detect the zero-current value using a circuit in a simple error-based structure of sampling and integrating error charge measured at a node $V_{FL2\_B}$ of a flying capacitor $C_{FL2}$ of FIG. 4 and adjusting an offset-controlled voltage VOS_CONT.

The resonance period counter 440 and the resonance period code generator 450 may be used to adjust a resonance count of the wireless power transmission system to optimize power delivered between a transmitter and the receiver of the wireless power transmission system in response to a change in power between a coil of the transmitter and a coil of the receiver. The resonance period code generator 450 may determine a resonance period count $N_{RC}$ by integrating the current, for example, the current $i_2$ of FIGS. 2A and 2B, output from the resonance circuit in a switching period $\varphi_2$.

The resonance period counter 440 may generate a resonance period code RC_CODE for controlling a switch in each of the switching periods $\varphi_1$ and $\varphi_2$. For example, a length of the resonance period code may be 3 bits. The resonance period counter 440 may count a resonance count based on a ring counter and a switch-cell. The resonance period counter 440 may generate an output $V_{OUT\_RCC}$ at a point in time at which the resonance count is met through the switch selected based on the resonance period code. A deadtime controller 460 may adjust gate driving signals ($\varphi_1$ and $\varphi_2$) to not overlap.

Figure 5:
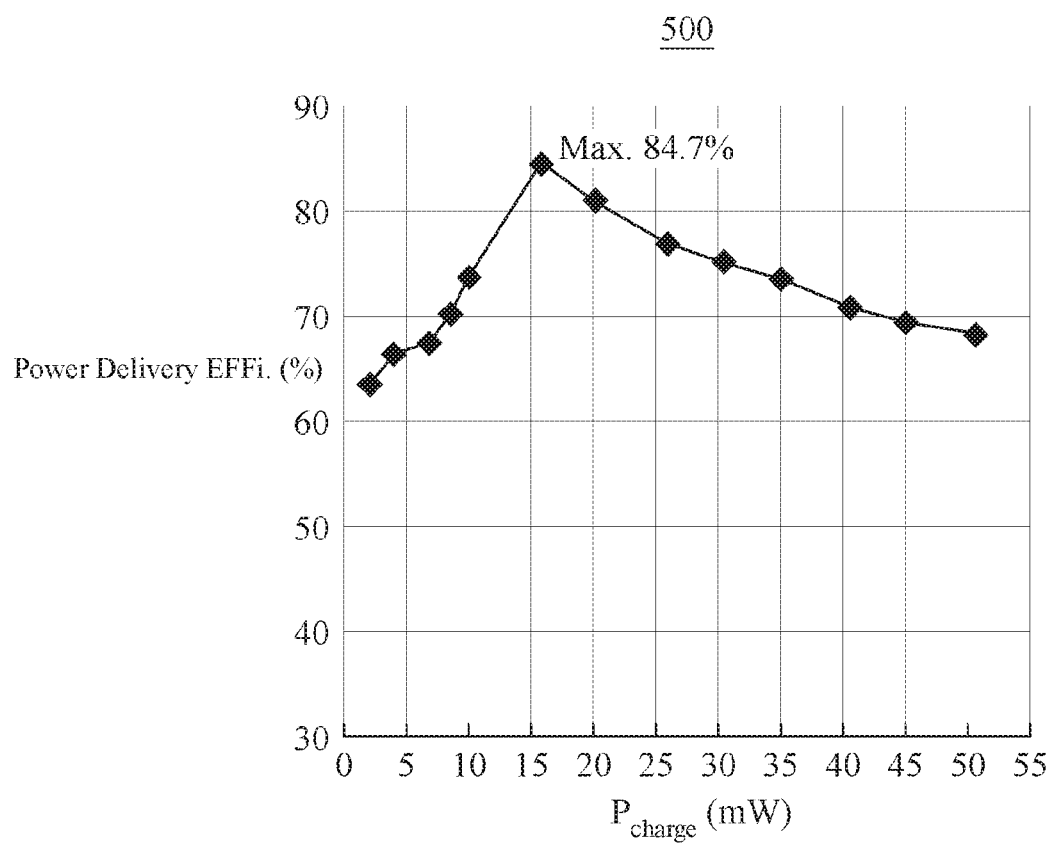
FIG. 5 is a graph showing a relationship between efficiency of a receiver and power delivered to a battery in response to operating a wireless power transmission system according to an example embodiment.

FIG. 5 is a graph 500 showing a relationship between efficiency of a receiver and power delivered to a battery in response to operating a wireless power transmission system according to an example embodiment.

Referring to FIG. 5, when an output voltage of the receiver of the wireless power transmission system is 1.1V, and when current, for example, the current $i_2$ of FIGS. 2A and 2B, of a resonance circuit in a switching period $\varphi_1$ is output to a battery connected to the receiver, a voltage of a switching node, for example, the switching node $V_x$ of FIGS. 2A and 2B, of the resonance circuit may instantaneously increase up to $3V_O$, that is, 1.1V×3=3.3 V, in an example in which the output voltage of the receiver is 1.1V. The voltage of the switching node may increase based on a number of flying capacitors. That is, in response to connection of capacitors of the receiver, the voltage of the switching node of the resonance circuit may increase by integer multiple of the voltage of the battery.

Since the voltage of the switching node increases instantaneously, RMS current of the resonance circuit may be reduced. Accordingly, referring to FIG. 5, efficiency of the receiver may be enhanced maximum up to 84.7%.

According to an example embodiment, a receiver of a wireless power transmission system may include (1) a capacitor and inductor configured to receive power from a transmitter using a resonance, (2) at least one capacitor, for example, the flying capacitors $C_{FL1}$ and $C_{FL2}$ of FIG. 1, configured to connect to an output node of the receiver, and (3) a plurality of switches configured to control current flow within the receiver. The plurality of switches may operate to reduce the RMS current within the receiver. The receiver may include a configuration, for example, the maximum current detector 420, the zero-current detector 430, the resonance period counter 440, the resonance period code generator 450, and the deadtime controller 460 of FIG. 4, to control the plurality of switches. The output node of the receiver may connect to the battery and/or power storage capacitor. In this case, the receiver may be used to wirelessly charge the battery and/or power storage capacitor.

In detail, the output node of the receiver may connect to the battery and may also connect to the power storage capacitor having relatively great storage capacity compared to that of the battery. When the capacitor is connected to the output node of the receiver, the example embodiment may be configured as a 'start-up circuit' capable of guaranteeing an initial circuit operation. Here, when it is assumed that the start-up circuit is configured, the power storage capacitor connected to the output node of the receiver a may be charged with a voltage capable of operating a control circuit through the start-up circuit and a normal state operation of a proposed circuit may be identical to a situation in which the battery is connected.

The plurality of switches may be controlled so that the capacitor and the inductor configured to receive the power from the transmitter receiving the power may be separate, for example, disconnected, from the at least one capacitor and the output node at preset periods, for example, every switching period $\varphi_1$. During separation, for example, disconnection from the at least one capacitor and the output node, current resonating in the capacitor-and-inductor receiving the power from the transmitter may increase. During separation, for example, disconnection from the capacitor and the inductor, the at least one capacitor connected to the output node may be connected in parallel.

After the period, the plurality of switches may connect the capacitor and the inductor to the at least one capacitor and the output node and may output, to the battery, current with a magnitude increased by resonance. After the period, the plurality of switches may connect the at least one capacitor connected to the output node in series. Accordingly, a magnitude of voltage between the capacitor and the inductor receiving the power from the transmitter and the at least one capacitor connected to the output node, for example, the output node $V_x$ of FIG. 1 and FIGS. 2A and 2B, may increase. Accordingly, the RMS current of the receiver may decrease and heat generated in the receiver may also decrease. Accordingly, power reception efficiency of the receiver may be enhanced.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receiver of a wireless power transmission system, the receiver comprising:
   an inductor configured to resonate with a transmitter that transmits power in the wireless power transmission system;
   a capacitor configured to store current occurring in the inductor by resonance of the inductor; and
   a plurality of switches configured to increase a magnitude of current occurring in the inductor by disconnecting the inductor and the capacitor and to connect the inductor, the capacitor, and an output node in series to deliver the current with the increased magnitude to the output node,
   wherein the plurality of switches is configured to increase a magnitude of current occurring in the inductor by disconnecting the resonance circuit and the switching capacitor circuit in a first period and delivering current amplified at the resonance circuit to the switching capacitor circuit to a second period, and
   wherein the first period and the second period are determined according to the amount of power flowing in the battery of the wireless power transmission system.

2. The receiver of claim 1, wherein the plurality of switches comprises:
   a first switch configured to connect the inductor and a ground node of the receiver;
   a second switch configured to connect a node between the first switch and the inductor and a first node of the capacitor;
   a third switch configured to connect the ground node and a second node of the capacitor;
   a fourth switch configured to connect the second node and the output node; and
   a fifth switch configured to connect the first node and the output node.

3. The receiver of claim 2, wherein the magnitude of the current occurring in the inductor increases due to the resonance of the inductor in response to the first switching being closed at the first period.

4. The receiver of claim 2, wherein the second switch is configured to close at the second periods and to deliver the current with the increased magnitude to the capacitor, and the first switch is configured to open at the second periods and to disconnect the inductor and the ground node during delivery of the current with the increased magnitude to the capacitor.

5. The receiver of claim 2, wherein the third switch and the fifth switch are configured to close during delivery of the current occurring in the inductor to the ground node through the first switch, so that the capacitor is connected to the output node in parallel.

6. The receiver of claim 5, wherein the fourth switch is configured to open in response to the third switch and the fifth switch being closed, and to deliver power of the capacitor to the output node.

7. The receiver of claim 2, wherein the fourth switch is configured to close in response to the second switch being closed and the first switch being opened, and to deliver the current with the increased magnitude to the output node.

8. The receiver of claim 7, wherein the third switch and the fifth switch are configured to open in response to the fourth switch being closed, and to connect the inductor, the capacitor, and the output node in series.

9. The receiver of claim 1, wherein, when the receiver comprises a plurality of capacitors, the plurality of switches is configured to connect the plurality of capacitors and the output node in parallel during disconnection between the inductor and the plurality of capacitors, and to connect the inductor, the plurality of capacitors, and the output node in series direction connection between the inductor and the plurality of capacitors.

10. A receiver of a wireless power transmission system, the receiver comprising:
    a resonance circuit configured to resonate with a transmitter of the wireless power transmission system;
    a battery and/or power storage capacitor configured to store power transmitted from the transmitter;
    a switching capacitor circuit comprising a plurality of capacitors configured to connect between the resonance circuit and the battery; and
    a plurality of switches configured to deliver current amplified at the resonance circuit to the switching capacitor circuit at preset periods,
    wherein the plurality of switches is configured to amplify the current by disconnecting the resonance circuit and the switching capacitor circuit in a first period and delivering current amplified at the resonance circuit to the switching capacitor circuit to a second period,
    wherein the first period and the second period are determined according to the amount of power flowing in the battery of the wireless power transmission system,
    wherein the switching capacitor circuit is configured to connect the plurality of capacitors so that the plurality of capacitors, the resonance circuit, and the battery and/or power storage capacitor are connected in series in response to receiving the current amplified at the resonance circuit through the switch.

11. The receiver of claim 10, wherein the switching capacitor circuit is configured to connect the plurality of capacitors so that the plurality of capacitors and the battery and/or power storage capacitor are connected in parallel in response to not receiving the current of the resonance circuit through the switch.

12. The receiver of claim 10, wherein the switching capacitor circuit is configured to connect the plurality of capacitors so that a voltage of a node connecting the resonance circuit and the switching capacitor circuit corresponds to an integer multiple of a voltage of the battery and/or power storage capacitor in response to receiving the current amplified at the resonance circuit through the switch.

13. A receiver of a wireless power transmission system, the receiver comprising:
    at least one capacitor configured to connect to a resonance circuit of the receiver at preset periods; and
    a plurality of switches configured to change a connection among the capacitor, the resonance circuit, and an output node of the receiver based on a first period and a second period,
    wherein the plurality of switches is configured to amplify current by disconnecting the resonance circuit and the switching capacitor circuit in the first period and delivering current amplified at the resonance circuit to the switching capacitor circuit to the second period,
    wherein the first period and the second period are determined according to the amount of power flowing in the battery of the wireless power transmission system, and
    wherein the plurality of switches is configured to connect the at least one capacitor and the output node in series every time the at least one capacitor and the resonance circuit are connected based on the second period, and to connect the at least one capacitor and the output node every time the at least one capacitor and the resonance circuit are disconnected based on the first period.

* * * * *